(12) United States Patent
Akieda et al.

(10) Patent No.: US 12,153,026 B2
(45) Date of Patent: Nov. 26, 2024

(54) LIQUID FEEDING APPARATUS AND LIQUID FEEDING METHOD

(71) Applicant: HITACHI HIGH-TECH CORPORATION, Tokyo (JP)

(72) Inventors: Daisuke Akieda, Tokyo (JP); Nobuhiro Tsukada, Tokyo (JP); Yusuke Yota, Tokyo (JP); Yuichiro Hashimoto, Tokyo (JP); Jun Maeda, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 274 days.

(21) Appl. No.: 17/911,469

(22) PCT Filed: Mar. 5, 2021

(86) PCT No.: PCT/JP2021/008759
§ 371 (c)(1),
(2) Date: Sep. 14, 2022

(87) PCT Pub. No.: WO2021/192929
PCT Pub. Date: Sep. 30, 2021

(65) Prior Publication Data
US 2023/0091683 A1 Mar. 23, 2023

(30) Foreign Application Priority Data
Mar. 24, 2020 (JP) .................. 2020-052082

(51) Int. Cl.
*G01N 30/32* (2006.01)
*G01N 30/34* (2006.01)

(52) U.S. Cl.
CPC .......... *G01N 30/32* (2013.01); *G01N 30/34* (2013.01); *G01N 2030/326* (2013.01); *G01N 2030/347* (2013.01)

(58) Field of Classification Search
CPC ....... G01N 2030/326; G01N 2030/347; G01N 30/32; G01N 30/34
(Continued)

(56) References Cited

U.S. PATENT DOCUMENTS 11,307,179 B2 * 4/2022 Yanagibayashi ........ F04B 23/06
2018/0119658 A1 5/2018 Kounosu et al.

FOREIGN PATENT DOCUMENTS

JP 5879280 B2 3/2016
WO WO-2011090188 A1 * 7/2011 ............ G01N 30/26
(Continued)

OTHER PUBLICATIONS

International Search Report, mailed Apr. 27, 2021, for International Application No. PCT/JP2021/008759.

*Primary Examiner* — Andre J Allen
(74) *Attorney, Agent, or Firm* — Baker Botts L.L.P.

(57) ABSTRACT

The present invention relates to a liquid feeding apparatus capable of feeding a liquid with high accuracy. The liquid feeding apparatus includes a liquid feeder having a downstream side, a plunger, and a cylinder that is configured for aspirating and discharging a solvent when a plunger slides. The liquid feeding apparatus further includes a pressure sensor for the solvent to be discharged, a selector valve configured to switch between a plurality of solvents to be aspirated and discharged, and a controller configured to control the liquid feeder and the selector valve. The controller controls the selector valve in synchronization with an aspiration operation of the plunger so that a mixing ratio of the solvents changes, controls the plunger to cause the plunger to operate at first and second accelerations that are different from each other, and suppresses a fluctuation of the solvent to be aspirated by the plunger.

12 Claims, 7 Drawing Sheets

(58) Field of Classification Search
USPC .............................................. 73/53.01–64.56
See application file for complete search history.

(56) References Cited

FOREIGN PATENT DOCUMENTS

| WO | WO 2016/167174 A1 | 10/2016 | |
| WO | WO-2019220563 A1 * | 11/2019 | ................ F04B 1/00 |
| WO | WO-2020183654 A1 * | 9/2020 | ............. G01N 30/32 |
| WO | WO-2020183774 A1 * | 9/2020 | ............. G01N 30/32 |

* cited by examiner

LIQUID FEEDING APPARATUS AND LIQUID FEEDING METHOD

TECHNICAL FIELD

The present invention relates to a liquid feeding apparatus and a liquid feeding method.

BACKGROUND ART

A liquid feeding apparatus is used for a liquid chromatograph (LC), for example. The liquid chromatograph is a chromatograph that uses a liquid for a mobile phase feeding a measurement target sample, and the liquid chromatograph includes a liquid feeding apparatus that feeds a solvent to be a mobile phase, an injection apparatus that introduces the sample into an analysis passage, a column that separates a measurement target sample introduced into the analysis passage into constituent components, and a detecting apparatus that detects the separated components.

The separation column that separates the measurement target sample is filled with a filler having a physical or chemical properties as a stationary phase. The measurement target sample is separated using the difference in the affinity between the stationary phase of the separation column and the mobile phase fed by the liquid feeding apparatus for every component, and the separated components are detected using a detector such as an ultraviolet-visible absorptiometer, a fluorophotometer, and a mass spectrometer.

The measured data of the liquid chromatograph is output as peaks indicating the relationship between the separation time (holding time) of the sample and the detection signal strength of the detector. The holding time is the time of the peak top. When the analysis conditions are the same, almost the same values are shown for every sample component, and the data is used as information that identifies the separated component.

Moreover, in the case in which a plurality of components is included, the separation is calculated from the holding time between components, and the separation is sometimes set as an index of the separation performance.

In some cases, in order to improve the adjustment of the separation time or separation by adjusting the elution time of the sample, an analysis method that is referred to as a gradient elution method is often adopted.

The gradient elution method is a method that feeds a mobile phase to the analysis passage and the separation column while temporally changing the composition ratio of the mobile phase fed from the liquid feeding apparatus, and it is possible to adjust the separation performance or the separation time of the sample component by changing the affinity between solvents that are in the stationary phase and the mobile phase.

The method that implements the gradient elution method includes a low-pressure gradient mixing method in which a plurality of types of mobile phases is mixed on the upstream side of one liquid feeding apparatus and a high-pressure gradient mixing method in which two liquid feeding apparatuses feed different mobile phases and the mobile phases are merged and mixed on the downstream side of the liquid feeding apparatus. From the difference in the properties of these gradient mixing methods, the low-pressure gradient mixing method is often used in the case in which the composition of the mobile phase is adjusted from the plurality of types of mobile phases, and the high-pressure gradient mixing method is often used in the case in which the compositions of two types of mobile phases are desired to be changed at responsibility as fast as possible.

In these methods, the low-pressure gradient mixing method achieves a composition at a given concentration in which a selector valve connected to the mobile phases, which is referred to as a proportioning valve, is opened and closed in synchronization with the aspiration process of the liquid feeding apparatus to aspirate and feed a specified volume from the plurality of types of mobile phases, and the performance of the gradient elution method and the composition performance of the mixing ratio of the mobile phase depend on the control of opening and closing the selector valve.

Patent Literature 1 discloses the operation control of a plunger in the opening and closing operation section of the selector valve. In order to reduce the influence of uniformity in the opening and closing operating time of the selector valve, a method is proposed in which the operating speed of the plunger aspirating the mobile phase is reduced or the plunger is stopped in the section in which the selector valve is opening and closing.

CITATION LIST

Patent Literature

Patent Literature 1: Japanese Patent No. 5879280

SUMMARY OF INVENTION

Technical Problem

As described in Patent Literature 1, in order that the shift of the composition of the mixture of mobile phases by the low-pressure gradient mixing method is reduced to improve correctness, it has been thought that the importance is to enhance correctness of the control of opening and closing the selector valve such that the opening and closing timing of the selector valve adjusting the supply time of the mobile phase to the cylinder matches the timing of aspirating the mobile phase.

On the other hand, the method in which the selector valve is opened and closed during the aspirating operation of the cylinder is known to have events that influence the uniformity of the accuracy of the mixing ratio such as the influence of pumping in which the mobile phase moves to and from due to the opening and closing operation of the selector valve the presence of not a little time for which the mobile phase is not temporarily carried, and the like, which are problems that are not improvable only by the control of opening and closing the selector valve.

Moreover, as one method of enhancing the operation correctness of the selector valve, it is also conceivable as one method that the drive performance of the selector valve is improved in order to improve mechanical opening and closing time. However, in reality, it is difficult to fully eliminate mechanical uniformity, which leads to the occurrence of the demerit of an increase in cost due to the performance confirmation and selection of the selector valve as well.

Furthermore, from experimental results of micro fluid simulation and changing the operation the timing of the selector valve, even in the case in which the plunger is stopped for every mobile phase to be aspirated and then the opening and closing operation of the selector valve is executed, a certain period of time is necessary to fully stop the mobile phase being aspirated by stopping the plunger, and it has been confirmed that the mobile phase is carried into the cylinder after the plunger is stopped or a correct volume might not be aspirated due to the occurrence of a fluctuation.

An object of the present invention is to embody a liquid feeding apparatus and a liquid feeding method that are capable of highly accurately feeding a liquid.

Solution to Problem

In order to achieve the object, the present invention is formed as follows.

The liquid feeding apparatus includes: a liquid feeder having a cylinder for performing operations of aspirating and discharging a solvent when a plunger slides; a pressure sensor installed on the downstream side of the liquid feeder and configured to detect pressure of the solvent to be discharged; at least one selector valve configured to switch between solvents to be aspirated and discharged; and a controller configured to control the operations of the liquid feeder and the operation of the selector valve. The controller is configured to control the operation of the selector valve in synchronization with the aspiration operation of the plunger so that a mixing ratio of the solvents changes, control the plunger to cause the plunger to operate at at least first acceleration and second acceleration that are different from each other, and suppress a fluctuation of the solvent to be aspirated by the plunger.

A liquid feeding method by a liquid feeding apparatus including a liquid feeder having a cylinder for performing operations of aspirating and discharging a solvent when a plunger slides, a pressure sensor installed on the downstream side of the liquid feeder and configured to detect pressure of the solvent to be discharged, at least one selector valve configured to switch between solvents to be aspirated and discharged, and a controller configured to control the operations of the liquid feeder and the operation of the selector valve, the method including: operating the selector valve in synchronization with the aspiration operation of the plunger so that a mixing ratio of the solvents changes; causing the plunger to operate at at least first acceleration and second acceleration that are different from each other; and suppressing a fluctuation of the solvent to be aspirated by the plunger.

Advantageous Effects of Invention

According to the present invention, it is possible to embody a liquid feeding apparatus and a liquid feeding method that are capable of highly accurately feeding a liquid.

DESCRIPTION OF EMBODIMENTS

In the following, a liquid feeding apparatus for a liquid chromatograph apparatus having a low-pressure gradient system and a liquid feeding method according to the present invention will be described.

In addition, the present invention is not limited to embodiments, and is applied regardless of, for example, types and numbers of a selector valve that is a proportioning valve, types of a liquid feeding apparatus in which cylinders of the liquid feeding apparatus are connected in series or connected in parallel, and the like. The present invention is applicable in the scope of its technical ideas.

EMBODIMENTS

First Embodiment

Figure 1:
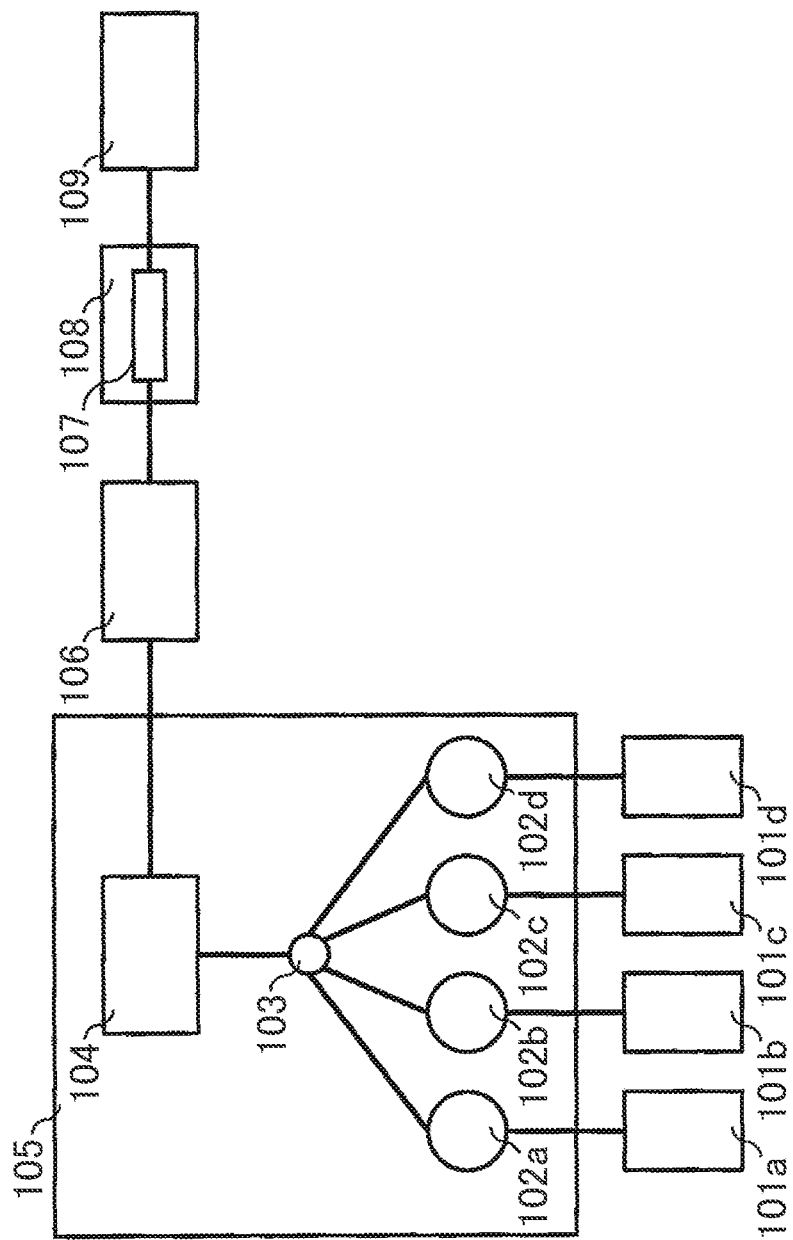
FIG. 1 is a schematic configuration diagram of an example of a liquid chromatograph apparatus used as a liquid feeding apparatus according to a first embodiment.

FIG. 1 is a schematic configuration diagram of one example of a liquid chromatograph apparatus to which a liquid feeding apparatus of a first embodiment is applied. The liquid chromatograph apparatus illustrated in FIG. 1 is a liquid chromatograph apparatus having a low-pressure gradient liquid feeding apparatus according to a low-pressure gradient mixing method, the liquid chromatograph apparatus having one liquid feeding apparatus 105 capable of feeding one or a plurality of mobile phases (solvents).

The liquid chromatograph apparatus includes the liquid feeding apparatus 105 having a feeder (liquid feeder) 104 that aspirates, compresses, at a high pressure, and discharges a plurality of mobile phases 10101a, 101b, 101c, 101d used for transportation or separation of a sample, a sample introducing apparatus 106, a separation column 107 that is connected through a passage to the downstream side of the sample introducing apparatus 106 and separates a measurement target sample introduced from the sample introducing apparatus 106 into components, a column temperature adjusting apparatus 108 that houses a separation column 107 and controls the separation column 107 in a constant temperature state, and a detecting apparatus 109 that is connected to the down stream part of the column temperature adjusting apparatus 108 and detects separated components of the sample.

The liquid feeding apparatus 105 has a merging point 103 for selector valves 102a, 102b, 102c, and 102d that are connected to the plurality of mobile phases 101a to 101d and switch the plurality of mobile phases and for the mobile phases.

Moreover, although not illustrated in FIG. 1, the liquid feeding apparatus 105 has a control unit (controller) 218. The liquid feeding apparatus 105 is a low-pressure gradient liquid feeding apparatus.

Figure 2:
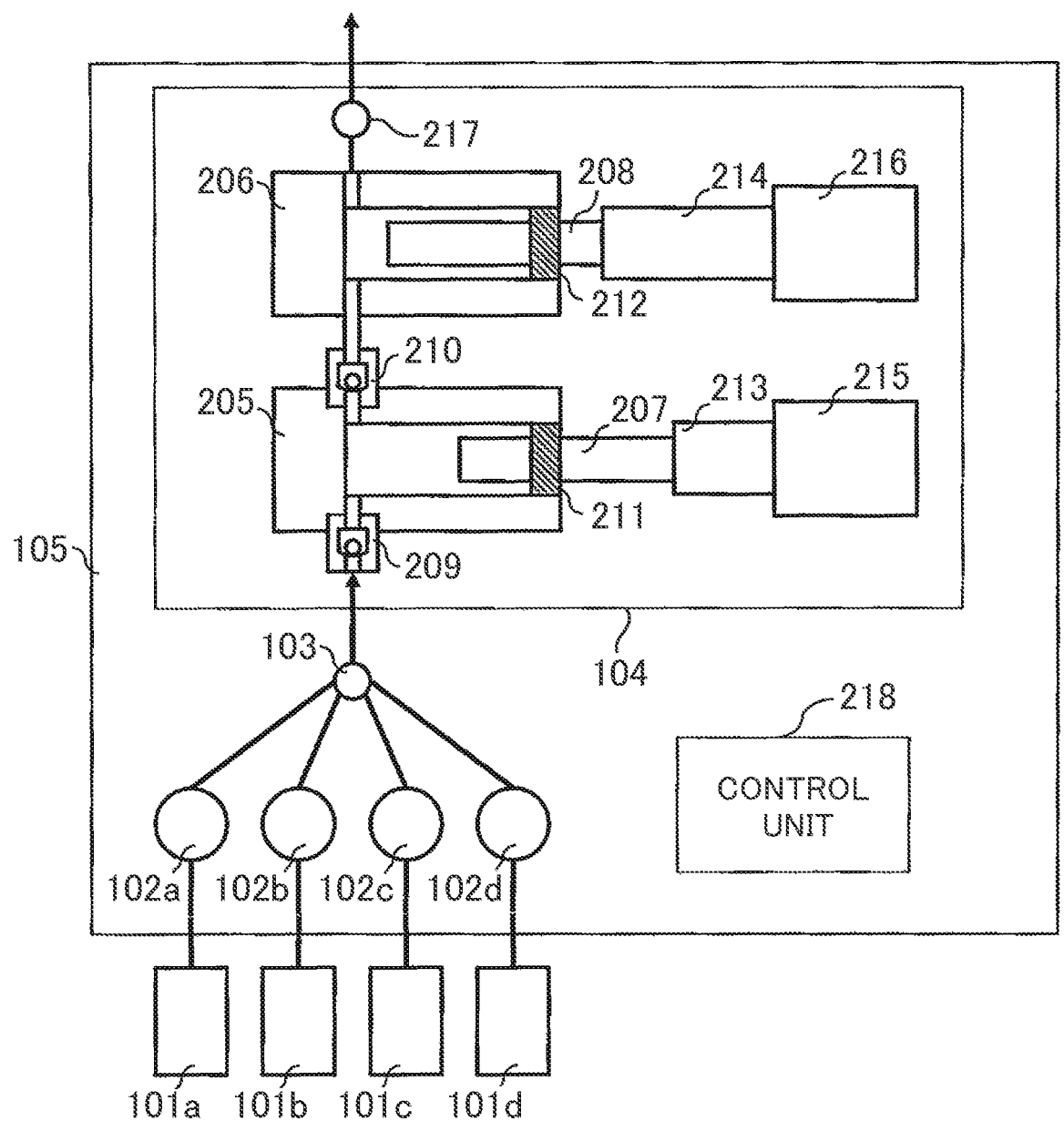
FIG. 2 is a diagram illustrating an internal configuration of a feeder illustrated in FIG. 1.

FIG. 2 is a diagram showing the internal configuration of the feeder 104 illustrated in FIG. 1.

The feeder 104 illustrated in FIG. 2 is an example of a feeder in the low-pressure gradient liquid feeding apparatus, and is a series type device having two cylinders, a first cylinder 205 and a second cylinder 206, disposed in series in which plungers 207 and 208 slide for reciprocating motion to aspirate and feed the mobile phase.

In FIG. 2, to motors 215 and 216, linear motion mechanisms 213 and 214 that convert rotational motion into linear motion are connected, and the plungers 207 and 208 fixed to the linear motion mechanisms 213 and 214 repeat reciprocating motion in the first cylinder 205 and the second cylinder 206 closed with sealing members 211 and 212. Thus, the feeder 104 aspirates and feeds the mobile phases 101a to 101d.

To the first cylinder 205 that aspirates the mobile phases 101a to 101d, check valves 209 and 210 that restrict the carrying direction of the mobile phases 101a to 101d are connected, and on the down stream part of the second cylinder 206, a pressure sensor 217 that detects the pressure of the mobile phase is installed. The control unit 218 adjusts the motor speeds of the motors 215 and 216 corresponding to a feeding pressure value detected by the pressure sensor 217 and a set feeding flow rate, and feeds the mobile phases 101a to 101d.

In low-pressure gradient mixing method in which the mixing ratio of the plurality of mobile phases 101a to 101d is changed corresponding to a lapse of time, in the process in which the first cylinder 205 aspirates the mobile phases 101a to 101d, the opening and closing states of the selector valve 102a to 102d connected to the mobile phases 101a to 101d is switched, and thus a given, set mixing ratio is embodied.

When the aspiration process of the mobile phases 101a to 101d is started, the plunger 207 starts an aspiration operation in accordance with the linear motion mechanism 213 operated by the motor 215, and the pressure in the first cylinder 205 is reduced from a feeding pressure to an atmospheric pressure. Thus, the closed check valve 209 on the aspiration side is opened, and the aspiration of the mobile phases 101a to 101d to the first cylinder 205 is started.

The control unit 218 determines the opening and closing timing and the opening and closing time of the selector valve 102a to 102d corresponding to the set mixing ratio of the mobile phases 101a to 101d, and switches the opening and closing states of the selector valve 102a to 102d corresponding to the determined result.

Thus, a given mixing ratio is embodied.

The mobile phases 101a to 101d to be aspirated are carried into the inside of the first cylinder 205 via the merging point 103. When the first cylinder 205 ends the aspiration process of the mobile phases 101a to 101d, the first cylinder 205 starts a compression process in which the mobile phases 101a to 101d are compressed to a feeding pressure.

When the pressure of the mobile phases 101a to 101d in the first cylinder 205 reaches the feeding pressure detected at the pressure sensor 217, the check valve 210 on the discharge side is opened, and the feeding process of the mobile phases 101a to 101d by the first cylinder 20 is started.

The plunger 208 in the second cylinder 206 operates so as to complement the operation of the first cylinder 205. When the first cylinder 205 operates under the aspiration process of the mobile phases 101a to 101d and the compression process of the mobile phases 101a to 101d to the feeding pressure, the second cylinder 206 is responsible for the feeding process. When the first cylinder 205 starts feeding the mobile phases 101a to 101d, the second cylinder 206 is under the filling process of the mobile phases 101a to 101d into the inside of the second cylinder 206 and under the waiting process to the feeding process in the subsequent cycle.

Figure 3:
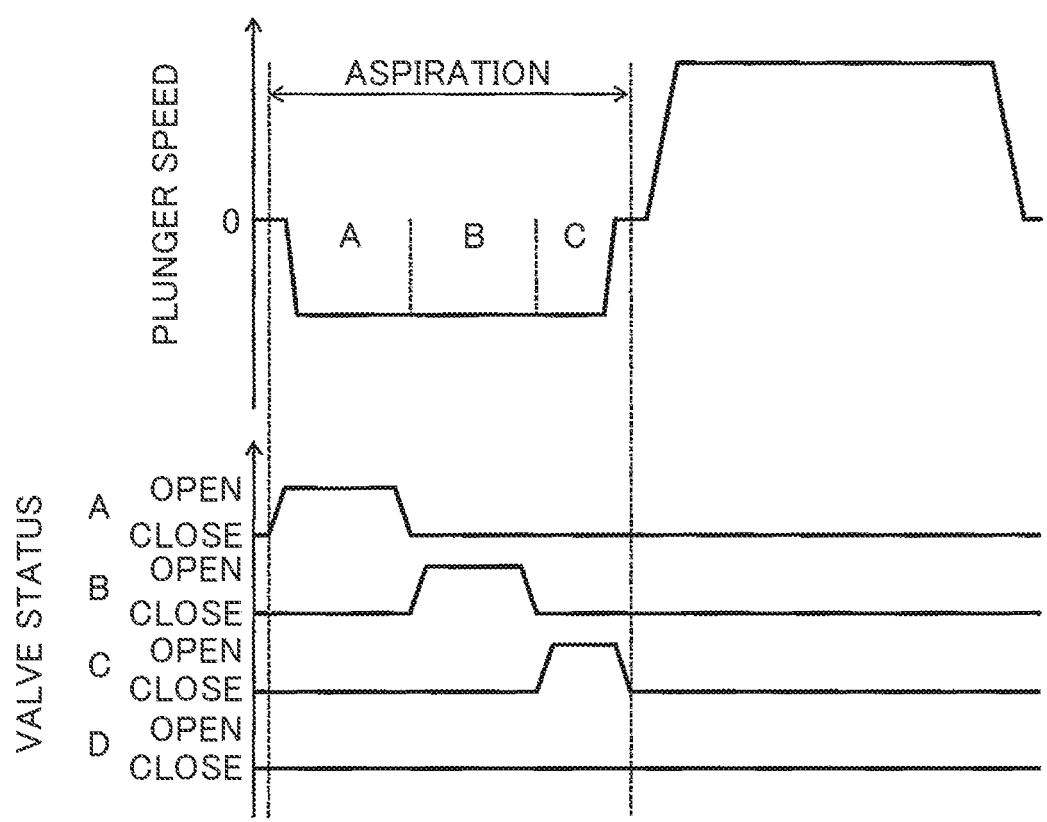
FIG. 3 is a schematic diagram describing a plunger speed of a liquid feeding apparatus having a low-pressure gradient mixing method and opening and closing timing of selector valves in an example different from the invention.

FIG. 3 is a schematic diagram describing the plunger speed of a liquid feeding apparatus having a low-pressure gradient mixing method and the opening and closing timing of a selector valve according to an example different from the present invention.

In FIG. 3, a selector valve A is turned from the closed state to the opened state, and then turned to the closed state after a lapse of a certain period of time. Subsequently, a selector valve B is turned from the closed state to the opened state, and turned to the closed state after a lapse of a certain period of time, a selector valve C is turned from the closed state to the opened state, and turned to the closed state after a lapse of a certain period of time. A selector valve D maintains the closed state.

In the different liquid feeding apparatus different from the present invention illustrated in FIG. 3, the opening and closing states of the selector valves A, B, C, and D are switched corresponding to the mixing ratio set in the aspiration process of the plunger aspirating the mobile phases at a constant speed. Thus, the mobile phases corresponding to the set mixing ratio are aspirated into the inside of the cylinder.

Figure 4:
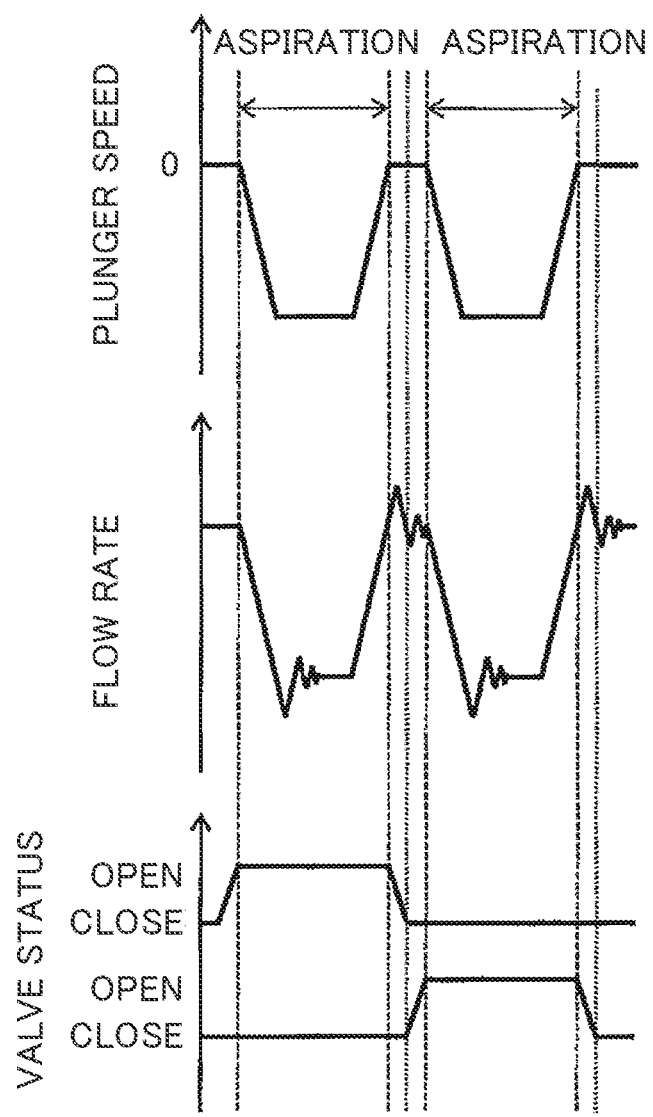
FIG. 4 is a diagram describing a pulsation of a mobile phase that is generated in an aspiration process in an example different from the invention.

FIG. 4 is a diagram illustrating the pulsation (fluctuation) of the mobile phase occurring in the aspiration process in an example different from the present invention. The waveforms illustrated in FIG. 4 indicate the operating speed of the plunger at the time of aspiration of the mobile phase obtained from micro fluid simulation, a change in a flow rate of a solvent aspirated at that time, and the switching timing of the selector valve.

In FIG. 4, when the selector valve is turned from the closed state to the opened state, the plunger accelerates and moves to reach a constant speed, the mobile phase fluctuates. Also when the plunger decelerates from a constant speed and stopped, the mobile phase fluctuates. Since the acceleration and deceleration of the plunger are almost the same by absolute values, equivalent fluctuations occur in the mobile phase.

When a large fluctuation occurs in the mobile phase, this influences the accuracy of the gradient mixing ratio.

Figure 5:
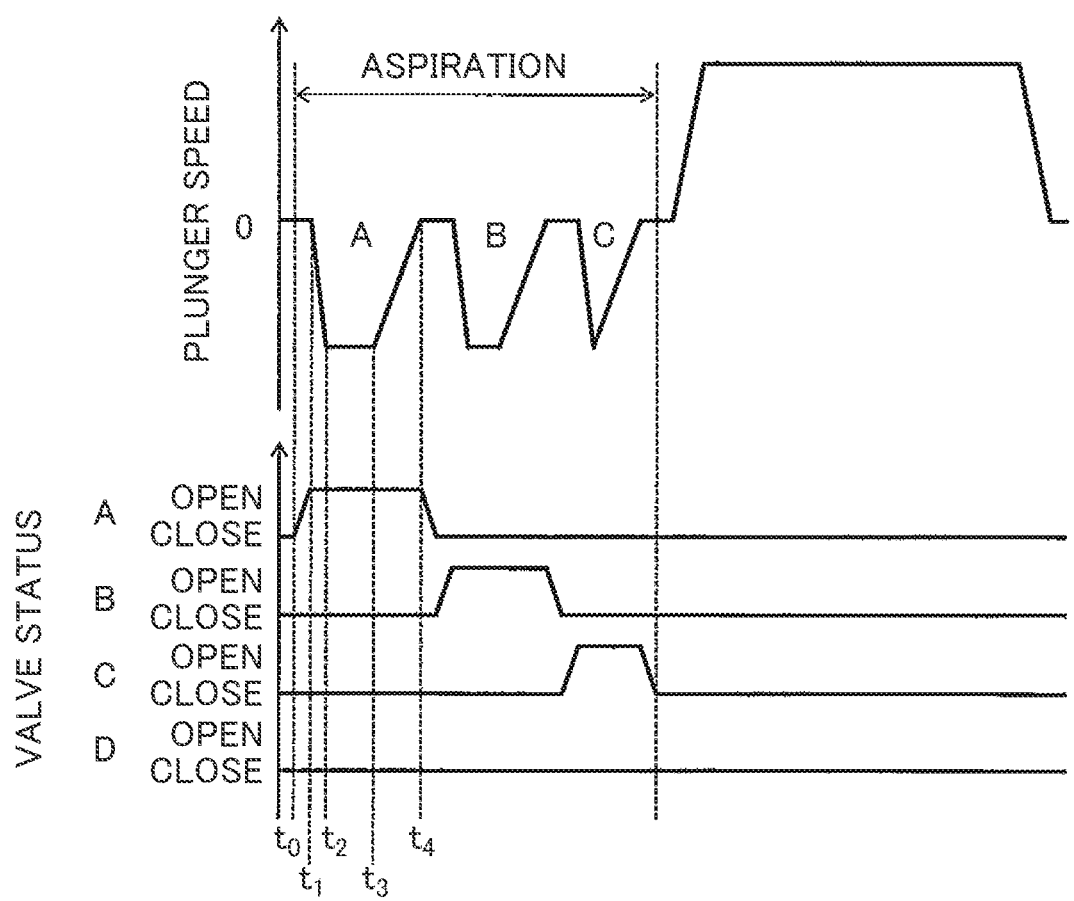
FIG. 5 is a schematic diagram of a plunger speed of the liquid feeding apparatus having a low-pressure gradient mixing method according to the first embodiment of the invention and opening and closing timing of selector valves.

FIG. 5 is a schematic diagram of the plunger speed of the liquid feeding apparatus having a low-pressure gradient mixing method according to the first embodiment of the present invention and the opening and closing timing of the selector valves 102a, 102b, 102c, and 102d.

In FIG. 5, the control unit 218 starts the aspiration process of the mobile phases 101a, 101b, 101c, and 101d. In synchronization with the aspiration process, the selector valves 102a, 102b, 102c, and 102d to be targets are controlled for opening, after a lapse of necessary and enough waiting time until the target ones of the selector valves 102a, 102b, 102c, and 102d are fully opened, the aspiration operation of the plungers 207 and 208 is started. At the time of end of the aspiration process of the mobile phases 101a, 101b, 101c, and 101d, the operating speed of the plunger decelerates by acceleration at a certain value or less, and the aspiration operation is stopped.

After the plungers 207 and 208 are fully stopped, the target selector valves 102a, 102b, 102c, and 102d are closed. In the case in which there are the selector valves 102a, 102b, 102c, and 102d to be subsequently opened, the target selector valves 102a, 102b, 102c, and 102d are opened, and the aspiration of the mobile phase is executed by a similar process.

In addition, A, B, C, D illustrated in FIG. 5 indicate the selector valves 102a, 102b, 102c, and 102d.

The control of moving the plungers 207 and 208 illustrated in FIG. 5 is performed by the control unit 218.

In FIG. 5, from time t0 to time t1, the selector valve A is turned from the closed state to the opened state. The plunger 207 or 208 moves while accelerating from time t1 to time t2 to reach a constant speed. The acceleration at this time is set as first acceleration.

Subsequently, the plunger 207 or 208 moves while decelerating from time t3 to time t4, and is stopped. The acceleration at this time is set as second acceleration. However, in this case, since the plunger 207 or 208 decelerates, the second acceleration is a negative acceleration. Therefore, the second acceleration is the same meaning as deceleration.

The time from time t1 to time t2 that is the first acceleration is shorter than the time from time t3 to time t4 that is the second acceleration. In other words, the absolute value of the first acceleration is larger than the absolute value of the second acceleration. As illustrated in FIG. 5, the tilt angle is larger in the case of the first acceleration than in the case of the second acceleration. Preferably, the tilt angle of the second acceleration is almost a half of the tilt angle of the first acceleration.

The deceleration of the plungers 207 and 208 is made smaller, and thus it is possible to suppress a fluctuation that occurs when the plungers 207 and 208 are stopped. Accordingly, it is possible to suppress the influence on the accuracy of the gradient mixing ratio.

Subsequently to the operation of the selector valve A and the operation of the plunger 207 or 208, the operation of the selector valves B and C and the operation of the plunger 207 or 208 are performed. The selector valve C maintains the closed state.

The operation of the selector valve C changes from the first acceleration to the second acceleration without the plunger 207 or 208 reaching a constant speed unlike the selector valves A and B.

Subsequently to the aspiration operation, although the discharge operation is performed, the detailed description is omitted.

According to the first embodiment of the present invention, in the case in which the aspiration operation and the stop operation of the plungers 207 and 208 are repeated for every mobile phase, the acceleration is set so as not to produce the fluctuation in the mobile phase, and thus it is possible to embody more accurate aspiration of the mobile phase.

Moreover, even in the case in which the aspiration operation is not stopped corresponding to the switching of the mobile phase like the conventional technique, the acceleration of the plungers 207 and 208 is set so as not to fluctuate in the mobile phase at the time point of end of the final aspiration process, and thus it is possible to accurately aspirate the mobile phase to be aspirated in the later half of the aspiration process.

In other words, according to the first embodiment of the present invention, it is possible to embody a liquid feeding apparatus and a liquid feeding method that are capable of highly accurately feeding a liquid.

Moreover, according to the first embodiment of the present invention, it is possible to embody a liquid chromatograph apparatus including a liquid feeding apparatus that is capable of highly accurately feeding a liquid.

Second Embodiment

Next, a second embodiment will be described.

The second embodiment is an example of a low-pressure gradient liquid feeding apparatus according to a low-pressure gradient mixing method similarly to the first embodiment.

Moreover, also in the second embodiment, similarly to the first embodiment, after the aspiration process of mobile phases is started, a selector valve to be a target is opened, and after a lapse of necessary and enough waiting time until the selector valve is fully opened, the aspiration operation of a plunger is started.

At the time of end of the aspiration process of the mobile phases, in order to shorten the time until the plunger is stopped, acceleration is gradually or continuously changed the operating speed of the plunger is finally decelerated at an acceleration at a certain value or less, and the aspiration operation is stopped.

After the plunger is fully stopped, the target selector valve is closed. In the case in which there is a selector valve to be subsequently opened, the target selector valve is opened, and the aspiration of the mobile phase is executed by a similar process.

Since the liquid chromatograph apparatus and the configuration of the liquid feeding apparatus to which the second embodiment is applied are similar to those of the first embodiment, and the illustrations the detailed description are omitted.

The difference of the second embodiment from the first embodiment is in that the operating acceleration of plungers 207 and 208.

Figure 6:
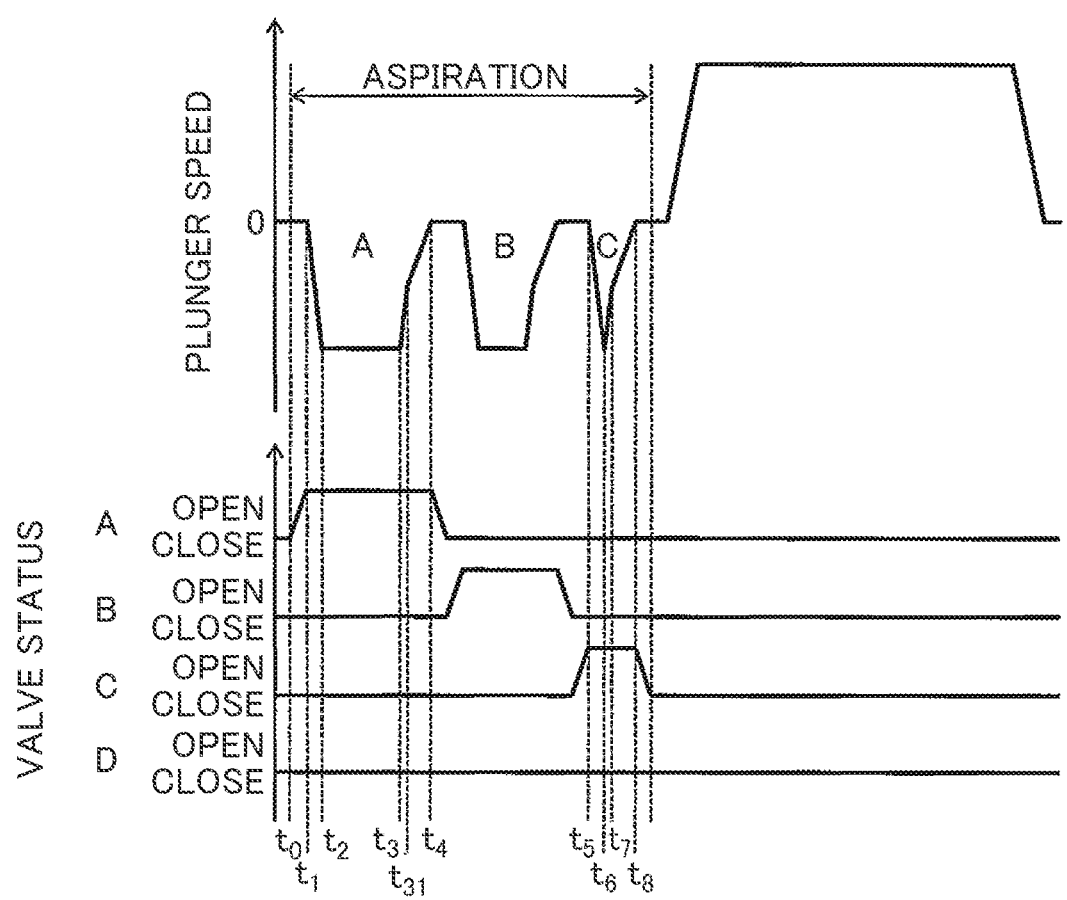
FIG. 6 is a schematic diagram of a plunger speed of a liquid feeding apparatus having a low-pressure gradient mixing method according to a second embodiment of the invention and opening and closing timing of selector valves.

FIG. 6 is a schematic diagram of the plunger speed of the liquid feeding apparatus having a low-pressure gradient mixing method according to the second embodiment of the present invention and the opening and closing timing of selector valves 102a, 102b, 102c, and 102d.

In FIG. 6, the operation of the plunger 207 or 208 from time t0 to time t3 is similar to the operation of the example illustrated in FIG. 5.

In the second embodiment, the plunger 207 or 208 moves at a third acceleration from time t3 to time t31, and moves from time t31 to time t4 at a second acceleration similar to the first embodiment. Since the plunger 207 or 208 decelerates, the third acceleration is a negative acceleration. The absolute value of the third acceleration is larger than the absolute value of the second acceleration.

In other words, the plunger 207 or 208 is gradually decelerated.

The operation of the plunger 207 or 208 in the opening and closing operation of a selector valve B is similar to the operation of the plunger 207 or 208 in the opening and closing operation of a selector valve A.

next, the operation of the plunger 207 or 208 in the opening and closing operation of a selector valve C will be described.

The operation from time t5 to time t6 is similar to the example illustrated in FIG. 5. The plunger 207 or 208 moves at the third acceleration from time t6 to time t7, and moves at the second acceleration from time t7 to time t8. In addition, the plunger 207 or 208 sometimes decelerates, and the second acceleration and the third acceleration become negative values. Therefore, the second acceleration and the third acceleration can also be defined as a second deceleration and a third deceleration.

According to the second embodiment, in addition to obtaining the effect equivalent to the first embodiment, the following effect can be obtained.

In other words, the second embodiment is an example in the case in which the deceleration of the plunger 207 or 208 is gradually changed. The deceleration at the start of deceleration of the plunger 207 or 208 is set large, and at the point in time at which the speed of the plunger 207 or 208 reaches a certain value or less, the deceleration is reduced. Thus, it is possible to shorten time necessary to stop the plunger 207 or 208 more than in the case of the first embodiment while suppressing a fluctuation in the mobile phase at the time of stopping the plunger 207 or 208, and it is possible to appropriately determine the opening and closing time of the selector valve in the aspiration process of the mobile phase having a temporal restriction.

Third Embodiment

Next, a third embodiment will be described.

Similarly to the first embodiment and the second embodiment, the third embodiment is an example of a low-pressure gradient liquid feeding apparatus according to a low-pressure gradient mixing method.

Moreover, also in the third embodiment, similarly to the first embodiment and the second embodiment, after the aspiration process of mobile phases is started, a selector valve to be a target is opened, and after a lapse of necessary and enough waiting time until to open the selector valve is fully opened, the aspiration operation of a plunger is started.

At the time of end of the aspiration process of the mobile phases, in order to shorten the time until the plunger is stopped, acceleration is gradually or continuously changed the operating speed of the plunger is finally decelerated at an acceleration at a certain value or less, and the aspiration operation is stopped.

After the plunger is fully stopped, the target selector valve is closed. In the case in which there is a selector valve to be subsequently opened, the target selector valve is opened, and the aspiration of the mobile phase is executed by a similar process.

The liquid chromatograph apparatus and the configuration of the liquid feeding apparatus to which the third embodiment is applied are similar to those of the first embodiment, and the illustrations the detailed description are omitted.

Similarly to the second embodiment, the third embodiment, the operating acceleration of a plunger 207 or 208 changes at a first acceleration, a second acceleration, and a third acceleration.

The difference of the third embodiment from the second embodiment is the set time of the operation operational acceleration of the plungers 207 and 208.

In the third embodiment, after starting the aspiration process of mobile phases 101a, 101b, 101c, and 101d in the control of a control unit 218 of a liquid feeding apparatus 105 having a low-pressure gradient mixing method, a target one of selector valves 102a, 102b, 102c, and 102d is opened, and after a lapse of necessary and enough waiting time until the selector valve is fully opened, the aspiration operation the plunger 207 or 208 is started.

In regard to the operating speed of the plunger 207 or 208 in the case in which the mixing ratio is high (=the aspiration volume is large) corresponding to the opening and closing time of the selector valves 102a, 102b, 102c, and 102d calculated from the mixing ratio of the mobile phases 101a, 101b, 101c, and 101d, the operating speed of the plunger 207 or 208 is set fast, whereas in the case in which the mixing ratio is low (=the aspiration volume is small), the operating speed of the plunger 207 or 208 is set slow.

At the time of end of the aspiration process of the mobile phases 101a, 101b, 101c, and 101d, in order to shorten the time to stop the plunger 207 or 208, acceleration is gradually or continuously changed, the operating speed of the plunger 207 or 208 is finally decelerated at an acceleration at a certain value or less, and the aspiration operation is stopped. After the plunger 207 or 208 is fully stopped, the target one of the selector valves 102a, 102b, 102c, and 102d is closed. In the case in which there is a selector valve to be subsequently opened, the target selector valve is opened, and the aspiration of the mobile phase is executed by a similar process.

Figure 7:
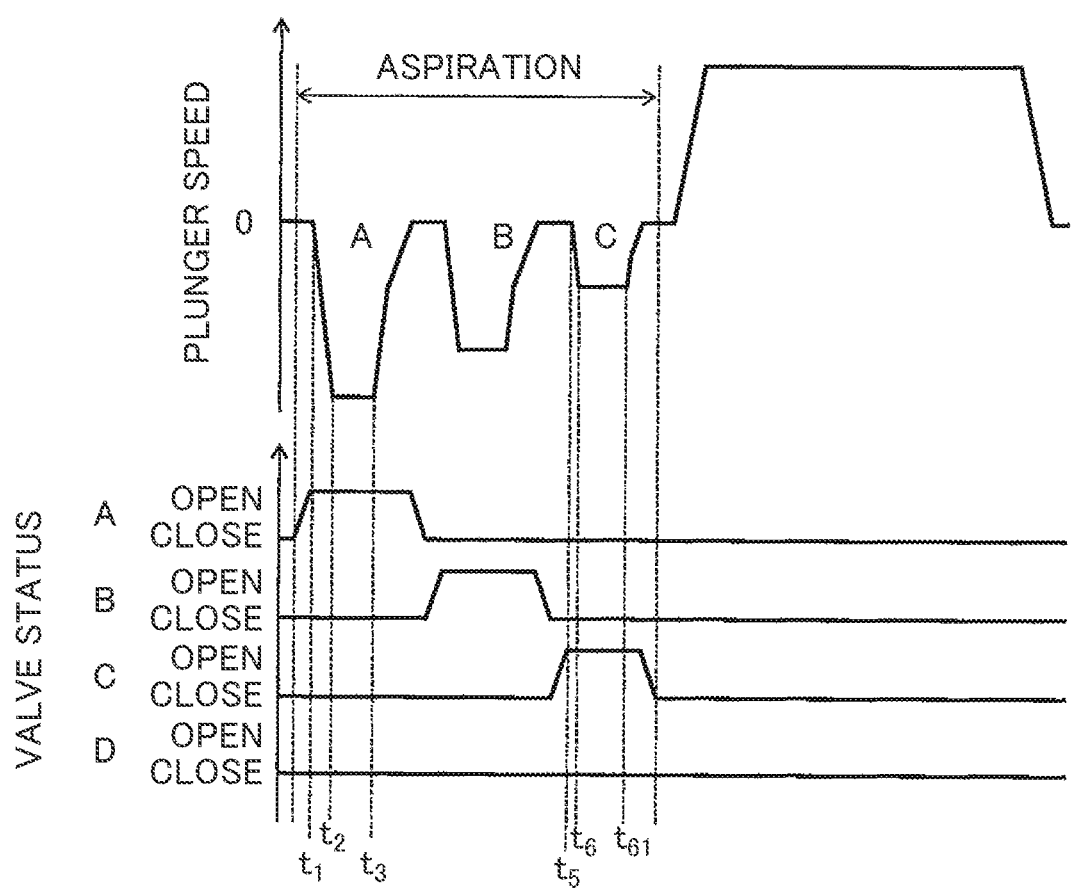
FIG. 7 is a schematic diagram of a plunger speed of a liquid feeding apparatus having a low-pressure gradient mixing method according to a third embodiment of the invention and opening and closing timing of selector valves.

FIG. 7 is a schematic diagram of the operating speed of the plunger of the liquid feeding apparatus having a low-pressure gradient mixing method according to the third embodiment of the present invention and the opening and closing timing of the selector valves 102a, 102b, 102c, and 102d.

In FIG. 7, a section from time t1 to time t2 is set longer than the example in FIG. 6, and a section from time t2 to time t3 is set shorter than the example in FIG. 6. Moreover, a section from time t5 to time t6 is set shorter than the example in FIG. 6, and in a section from time t6 to time t61, a section is set in which the operating speed of the plunger 207 or 208 is constant.

As illustrated in FIG. 7, the aspiration speed of the plunger 207 or 208 is set corresponding to the mixing ratio, and the acceleration of the plunger 207 or 208 at the time of deceleration is gradually changed. The acceleration (third acceleration) at the start of deceleration of the plunger 207 or 208 is set large, the operating speed of the plunger 207 or 208 reaches a certain value or less, and after that, the acceleration is reduced to be set to the second acceleration.

In other words, in the first embodiment and the second embodiment, in the aspiration operation of the solvent of any of the solvent 101a, 101b, 101c, 101d, the speed at which the speed is constant and the speed changing from the first acceleration to the second acceleration or the third acceleration are the same. However, in the third embodiment, the speed to be constant is changed according to a type of solvent, the time of aspiration by a selector valve C is set longer than the first embodiment and the second embodiment.

With this configuration, even the selector valve having a small mixing ratio that is difficult to reserve a sufficient time of aspiration in the aspiration process having a temporal restriction is possible to reserve the opening and closing time in consideration of the acceleration of the plunger at the time of stopping, and it is possible to suppress a fluctuation in the mobile phase at the time of stopping the plunger.

According to the third embodiment of the present invention 3, in addition to obtaining the effect similar to the second embodiment, it is possible to obtain the effects described above.

In addition, in the foregoing second and third embodiments, the operating speed of the plunger 207 or 208 is set to three accelerations, the first acceleration, the second acceleration, and the third acceleration. However, a fourth acceleration may be set.

Moreover, in the foregoing second and third embodiments, in regard to the operating speed of the plunger 207 or 208, a plurality of accelerations is gradually changed. However, the acceleration may be changed in a curved manner, and may be continuously changed.

Furthermore, in the foregoing examples, the configuration is provided in which a plurality of selector valves is included. However, a configuration may be provided in which a plurality of mobile phases (solvent) of one selector valve is switched.

REFERENCE SIGNS LIST 101a, 101b, 101c, 101d Mobile phase, 102a, 102b, 102c, 102d . . . Selector valve, 103 . . . Merging point, 104 . . . Feeder, 105 . . . Liquid feeding apparatus, 106 . . . Sample introducing apparatus, 107 . . . Separation column, 108 . . . Column temperature adjusting apparatus, 109 . . . Detecting apparatus, 205 . . . First cylinder, 206 . . . Second cylinder, 207, 208 . . . Plunger, 209 . . . Aspiration-side check valve, 210 . . . Discharge-side check valve, 211, 212 . . . Sealing member, 213, 214 . . . Linear motion mechanism, 215, 216 . . . Motor, 217 . . . Pressure sensor, 218 . . . Control unit

What is claimed is:

1. A liquid feeding apparatus comprising:
a liquid feeder having a downstream side, a plunger, and a cylinder, wherein the liquid feeder is configured for performing, when the plunger slides, an aspiration operation to aspirate a solvent and a discharging operation to discharge the solvent;
a pressure sensor installed on the downstream side of the liquid feeder and configured to detect a pressure of the solvent to be discharged;
at least one selector valve configured to switch between a plurality of solvents to be aspirated and discharged; and
a controller configured to control the liquid feeder and the selector valve, wherein
the controller is configured to control the selector valve in synchronization with the aspiration operation of the plunger so that a mixing ratio of the solvents changes, control an acceleration of the plunger to cause the plunger to operate at least at a first acceleration and a second acceleration that are different from each other, and suppress a fluctuation of the solvent to be aspirated by the plunger, and
the second acceleration is negative, an absolute value of the first acceleration is larger than an absolute value of the second acceleration, and the controller causes the plunger to operate at the first acceleration in the aspiration operation and then operate at the second acceleration and stops the plunger.

2. The liquid feeding apparatus according to claim 1, wherein
the controller changes the acceleration of the plunger step-by-step or continuously and stops the plunger in the aspiration operation.

3. The liquid feeding apparatus according to claim 2, wherein
a plurality of the cylinders are installed.

4. The liquid feeding apparatus according to claim 3, wherein
when the selector valve is to be opened, a standby period sufficient for termination of an operation of opening is provided and the controller starts the aspiration operation of the plunger after the standby period, and
when the selector valve is to be closed at the time of termination of the aspiration operation, the controller starts an operation of closing the selector valve in a state in which the aspiration operation of the plunger is terminated and the plunger is completely stopped.

5. The liquid feeding apparatus according to claim 4, wherein the controller
controls the plunger to cause the plunger to operate at the first acceleration, the second acceleration, and a third acceleration that are different from each other, wherein the second acceleration is negative, an absolute value of the first acceleration is larger than an absolute value of the second acceleration, the third acceleration is negative, and an absolute value of the third acceleration is larger than the absolute value of the second acceleration; and
causes the plunger to operate at the first acceleration, then, operate at the third acceleration, and then operate at the second acceleration and stops the plunger.

6. The liquid feeding apparatus according to claim 5, wherein
a plurality of solvents is used as the solvent, and the controller determines, based on the mixing ratio of the solvents, a volume of each of the solvents to be aspirated and determines the first acceleration, the second acceleration, and the third acceleration of the plunger that aspirates the solvents based on the determined volumes of the solvents to be aspirated.

7. The liquid feeding apparatus according to claim 1, wherein
the liquid feeding apparatus is a liquid feeding apparatus of a liquid chromatograph apparatus.

8. A liquid feeding method by a liquid feeding apparatus including a liquid feeder having a cylinder for performing, when the plunger slides, an aspiration operation to aspirate a solvent and a discharging operation to discharge the solvent, a pressure sensor installed on the downstream side of the liquid feeder and configured to detect a pressure of the solvent to be discharged, at least one selector valve configured to switch between a plurality of solvents to be aspirated and discharged, and a controller configured to control the liquid feeder and the selector valve, the method comprising:
operating the selector valve in synchronization with the aspiration operation of the plunger so that a mixing ratio of the solvents changes;
causing the plunger to operate at least at a first acceleration and a second acceleration that are different from each other;
suppressing a fluctuation of the solvent to be aspirated by the plunger, wherein the second acceleration is negative and an absolute value of the first acceleration is larger than an absolute value of the second acceleration;
causing the plunger to operate at the first acceleration in the aspiration operation and then operate at the second acceleration; and
stopping the plunger.

9. The liquid feeding method according to claim 8, further comprising:
changing the acceleration of the plunger step-by-step or continuously and stopping the plunger in the aspiration operation.

10. The liquid feeding method according to claim 9, wherein
when the selector valve is to be opened, a standby period sufficient for termination of an operation of opening the selector valve is provided, and the aspiration operation of the plunger is started after the standby period, and
when the selector valve is to be closed at the time of termination of the aspiration operation, an operation of closing the selector valve is started in a state in which the aspiration operation of the plunger is terminated and the plunger is completely stopped.

11. The liquid feeding method according to claim 10, wherein the plunger operates at the first acceleration, the second acceleration, and a third acceleration that are different from each other, wherein the second acceleration is negative, an absolute value of the first acceleration is larger than an absolute value of the second acceleration, the third acceleration is negative, and an absolute value of the third acceleration is larger than the absolute value of the second acceleration; and operates at the first acceleration, then operates at the third acceleration, and then operates at the second acceleration, and is stopped.

12. The liquid feeding method according to claim 11, wherein a plurality of solvents are used as the solvent, and the method further comprises determining, based on the mixing ratio of the solvents, a volume of each of the solvents to be aspirated and determining the first acceleration, the second acceleration, and the third acceleration of the plunger that aspirates the solvents based on the determined volumes of the solvents to be aspirated.

* * * * *